United States Patent
Wang (10) Patent No.: US 8,140,100 B2
(45) Date of Patent: Mar. 20, 2012

(54) METHOD, SYSTEM AND APPARATUS FOR IMPLEMENTING PUSH TO TALK OVER CELLULAR SESSION STORING AND BROADCASTING

(75) Inventor: Zheng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 712 days.

(21) Appl. No.: 12/256,942

(22) Filed: Oct. 23, 2008

(65) Prior Publication Data

US 2009/0047985 A1 Feb. 19, 2009

Related U.S. Application Data

(63) Continuation of application No. PCT/CN2007/070209, filed on Jun. 29, 2007.

(30) Foreign Application Priority Data

Jun. 30, 2006 (CN) .......................... 2006 1 0061494
Sep. 28, 2006 (CN) .......................... 2006 1 0159651

(51) Int. Cl.
 *H04B 7/00* (2006.01)
(52) U.S. Cl. ........................................ 455/518; 455/519
(58) Field of Classification Search .................. 455/518, 455/519, 520; 709/204; 370/328
See application file for complete search history.

(56) References Cited

U.S. PATENT DOCUMENTS 7,738,893 B2 * 6/2010 Lim ................................ 455/518

2005/0144233 A1* 6/2005 Kjesbu et al. .................. 709/204
2006/0040689 A1* 2/2006 Yoon et al. .................... 455/518
2006/0171351 A1* 8/2006 Wild et al. ..................... 370/328
2007/0226295 A1* 9/2007 Haruna et al. ................. 709/204

FOREIGN PATENT DOCUMENTS

| CN | 1708081 A | 12/2005 |
|---|---|---|
| CN | 1738449 A | 2/2006 |
| CN | 1784031 A | 6/2006 |
| WO | WO 2005/041574 A1 | 5/2005 |

OTHER PUBLICATIONS

1st Office Action in corresponding Chinese Application No. 200610159651.0 (Nov. 8, 2010).
Written Opinion of the International Searching Authority in corresponding PCT Application No. PCT/CN2007/070209 (Oct. 11, 2007).
Rejection Decision in corresponding Chinese Application No. 200610159651.0 (Oct. 10, 2011).

* cited by examiner

*Primary Examiner* — Lana N Le
*Assistant Examiner* — Golam Sorowar
(74) *Attorney, Agent, or Firm* — Leydig, Voit & Mayer, Ltd.

(57) ABSTRACT

A system for storing and broadcasting PoC sessions includes: a message storing module, adapted to receive a media stream in a session, into the media stream into a pattern storable by the message storing module, and store the media stream to the message storing module; read the message from the message storing module, convert the message into a media stream, and send the media stream for participating in the session; and a gateway transfer module. A method and an apparatus for storing and broadcasting PoC sessions are also provided. The present invention enables storing and broadcasting of PoC sessions at lower cost.

14 Claims, 5 Drawing Sheets

METHOD, SYSTEM AND APPARATUS FOR IMPLEMENTING PUSH TO TALK OVER CELLULAR SESSION STORING AND BROADCASTING

CROSS-REFERENCE TO RELATED APPLICATIONS

This application is a continuation of International Patent Application No. PCT/CN2007/070209, filed Jun. 29, 2007, which claims priority to Chinese Patent Application No. 200610061494.X, filed Jun. 30, 2006 and Chinese Patent Application No. 200610159651.0, filed Sep. 28, 2006, all of which are hereby incorporated by reference in their entirety.

FIELD OF THE INVENTION

The present invention relates to communication field, and more particularly, to a method, system, and device for implementing Push to talk over cellular, PoC, session storing and broadcasting.

BACKGROUND OF THE INVENTION

Push to talk over cellular, PoC, is a half-duplex, bidirectional, instant, and multiparty communication technology based on public cellular mobile communication networks and provides a user with group session services of multimedia for communication with one or more parties. PoC service is similar to walkie-talkie services in which a user pushes a button to talk to another user or to broadcast to the terminal of the group participants; after the initial voice, other participants may respond to the voice message. Because the PoC communication is half-duplex, only one participant is allowed to speak each time while the other participants are listening. A PoC work team has been established officially by Open Mobile Alliance, OMA, in April, 2003 to constitute the standards of the PoC system structure. In the PoC service, a significant function is to provide the storing and broadcasting services when the user is unable to take part in a session. Therefore, the message that the user wishes to broadcast during the session without his presence may be pre-stored and broadcasted later, while the conversation made by other users may also be stored and broadcasted to the user when the session is over. In order to implement the storing and broadcasting of the session, PoC develops a PoC message storing function, i.e. PoC Box, taking the place of the user in the session by broadcasting the pre-stored message and storing the content of the session.

Users may communicate with a PoC storing module having PoC Box via a terminal with PoC function, and upload message the user wishes to broadcast during the session. Further, users may communicate directly with a PoC storing module, listen to the message recorded during the session PoC storing module takes part in and perform management operations, such as deletion, on data. Each user corresponds to a PoC storing module, and different identifiers may be used to identify PoC storing modules of different users.

Network PoC message storing function, i.e. NW PoC Box, is specified in PoC 2.0 by OMA as follows: the PoC server and Session Initiation Protocol/Internet Protocol (SIP/IP) CORE are respectively connected with the PoC storing module having PoC Box via the PoC11 and 12 interfaces. The PoC 11 interface supports communication between the network PoC storing module and SIP/IP CORE and employs the SIP protocol. PoC 12 interface is an interface between the PoC storing module and PoC server, and employs Real time Transport Protocol (RTP) and Real time Transport Control Protocol (RTCP). PoC terminal may communicate with a PoC server and a PoC storing module, respectively, via PoC 11 and 12 interfaces to implement functions of leaving message, broadcasting message, inviting the PoC storing module to take part in the session, and managing PoC Box data, etc.

The PoC Box provided in the PoC service may provide session storing and broadcasting service in a session; however, because of the immaturity of the PoC Box, all infrastructures need to be newly established if the PoC Box is to be applied, which increases investment and causes a great waste. Currently, no solution is available for implementing PoC session storing and broadcasting as well as reducing the investment.

SUMMARY OF THE INVENTION

An embodiment of the present invention provides a system adapted to implement the session storing and broadcasting. The system is capable of reusing resources of the established network to implementing the session storing and broadcasting in the PoC services with a smaller investment.

An embodiment of the present invention provides a method adapted to implement the session storing and broadcasting. The method is capable of reusing resources of the established network to implementing the session storing and broadcasting in the PoC services with a smaller investment.

An embodiment of the present invention provides an apparatus adapted to implement the session storing and broadcasting. The apparatus is capable of reusing resources of the established network to implement the session storing and broadcasting in the PoC services with a smaller investment.

The embodiments of the present invention provide the technical solutions including the following:

a method for implementing Push To Talk session storing and broadcasting, including:
receiving a media stream, converting the media stream into a message complying with the storing pattern of a message storing module and storing the message into the message storing module by a gateway transfer module; and
reading the message pre-stored in the message storing module, converting the message into a media stream and sending the media stream to a session by the gateway transfer module.

A system for implementing the Push To Talk session storing and broadcasting includes a message storing module and a gateway transfer module.

The message storing module is adapted to receive stored message sent by the gateway transfer module, so that the message could be read by the gateway transfer module.

The gateway transfer module is adapted to convert the media stream received during the session into the message complying with the storing pattern of the message storing module and store the message into the message storing module, read the message from the message storing module, convert the message into the media stream, and send the media stream to the session.

An apparatus for implementing Push to Talk session storing and broadcasting includes a media stream transceiver module, a message transceiver module, and a conversion module.

The media stream transceiver module is adapted to receive the media stream of the session, transmit the media stream to the conversion module, and send the media stream provided by the conversion module to the session.

The message transfer module is adapted to acquire the stored message from the message storing module outside the apparatus and provide the conversion module with the message, receive the message provided by the conversion module, and store the message into the message storing module.

The conversion module is adapted to receive the media stream transmitted by the media stream transceiver module and convert the message into the storing pattern complying with the message storing module outside the apparatus, receive the message transmitted by the message transceiver module, convert the message into media stream, and transmit the media stream to the media stream transceiver module.

According to the method, system and apparatus for session storing and broadcasting in embodiments of the present invention, the media stream is converted into the message storing complying with storing pattern of the message conversion module, and the stored message of the message storing module is converted into media stream to participate in the session. As a result, the message storing function may be implemented by using the resources of the existing network with the similar PoC message storing function. The reuse of the existing resources saves cost of the construction of the infrastructure fitting the PoC storing apparatus; therefore, the functions of session storing and broadcasting are implemented with a reduced investment.

DETAILED DESCRIPTION OF EMBODIMENTS

Detailed descriptions are given to the embodiments as follows by reference to the drawings.

First, a detailed description is given to a system for implementing PoC session storing and broadcasting. The system includes a message storing module and a gateway transfer module.

The message storing module is adapted to receive stored message sent by the gateway transfer module, so that the message could be read by the gateway transfer module.

The gateway transfer module is adapted to convert the media stream received during the session into the message complying with the storing pattern of the message storing module and store the message into the message storing module, read the message from the message storing module, convert the message into the media stream and send the media stream to the session.

According to the system for session storing and broadcasting in embodiments of the present invention, the media stream is converted into the message storing complying with storing pattern of the message conversion module, and the stored message of the message storing module is converted into media stream to participate in the session. As a result, the message storing function may be implemented by using the resources of the existing network resources with the similar PoC message storing function. The reuse of the existing resources saves cost of the construction of the infrastructure fitting the PoC storing apparatus; therefore, the functions of session storing and broadcasting are implemented with a reduced investment.

The above-mentioned system may further include a PoC server and a PoC terminal.

The PoC server is adapted to receive media stream sent by the PoC terminal taking part in a session and transfer the media stream to the gateway transfer module; and receive media stream sent by the gateway transfer module and transfer the media stream to the PoC terminal.

In the system for session storing and broadcasting in accordance with embodiments of the invention, the message storing module may be implemented by using the resources of the existing network resources with the similar PoC message storing function, for example, by using resources in a voice mailbox in the existing network. Two implementation modes of the message storing module are illustrated as follows.

First, Multimedia Messaging Service (MMS) is a messaging service capable of providing users with information in form of such as text, picture, voice, and data etc. Multimedia Message Box (MM Box) is a function of eternally storing a multimedia message based on the network and corresponds to a multimedia message storing module having MM Box. When submitting a multimedia message, an originator may require a MMS system to duplicate the multimedia message into the multimedia message storing module; a recipient may require or store by way of configuration the transmitted multimedia message into the multimedia message storing module.

Each MMS user terminal corresponds to a multimedia message storing module of its own. The MMS user terminal is a terminal having MMS function. At present, the multimedia message storing module identifies different user terminals according to mobile terminal identifiers (mobile phone number) to provide services for different users. Users may perform operations such as multimedia message upload, review, deletion, and extraction on their multimedia message storing modules via user terminals having MMS function.

Second, Converged IP messaging, CPM, function based on IP may be used to temporarily store media messages, access and broadcast messages. The CPM messages are used to provide the users with messages in the form of text, video, voice, and data, and the message storing function, i.e. CPM Box is used to implement eternal storage of CPM message based on network. Users may perform operations such as multimedia message upload, review, deletion, and extraction on CPM multimedia message storing modules via CPM user terminals. The CPM user terminal may include mobile terminals, computer terminals, and users may access CPM message storing module via email by using the CPM user terminal.

Beside the above two functions, voice mail box in the existing voice mail system may also implement similar functions.

Two exemplary embodiments for implementing PoC session storing and broadcast system are detailed as follows by reference to the message storing modules having the above two functions.

Figure 1:
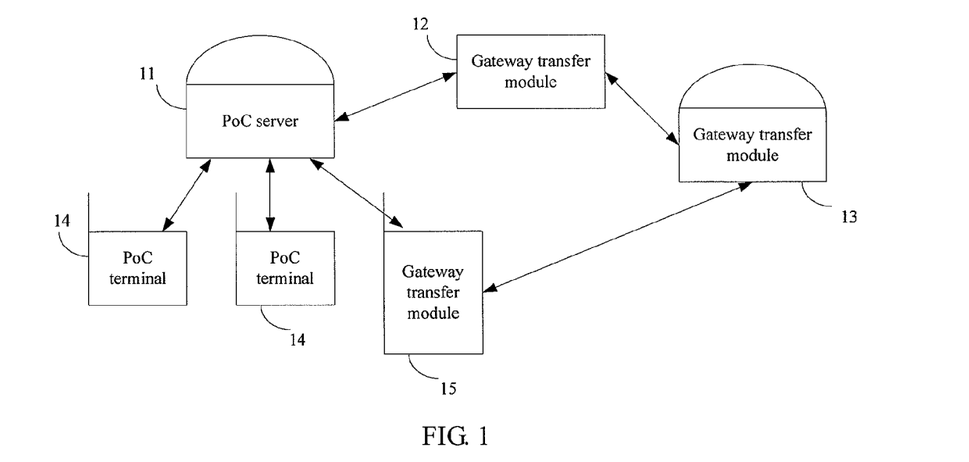
FIG. 1 shows a structure diagram of a system for implementing PoC session storing and broadcasting in accordance with an embodiment of the present invention.

FIG. 1 is a structure diagram of a system for implementing PoC session storing and broadcasting in accordance with an embodiment of the present invention. The system includes a PoC server 11, a gateway transfer module 12, a multimedia message storing module 13, and a plurality of PoC terminals 14 (PoC terminal having MMS function is identified by 15).

The plurality of PoC terminals 14 may communicate with the PoC server 11 in a session via 2.5 G networks such as Global System for Mobile Communication (GSM)/General Packet Radio Service (GPRS) and Code Division Multiple Access (CDMA) 1×, or 3G networks, such as Wideband Code Division Multiple Access (WCDMA) and CDMA 2000. The PoC terminal 15 having MMS function may directly communicate with the multimedia message storing module 13.

The PoC server 11 is connected with the gateway transfer module 12, transmits media streams transmitted by the PoC terminal to the gateway transfer module 12, and transmits media streams transmitted by the gateway transfer module 12 to each PoC terminal.

Messages complying with storage types supported by the multimedia message storing module 13 are called multimedia messages. Because different users need to be provided with their corresponding multimedia message storing modules, these modules may be sectioned into more than one storage area, according to the storage space of the multimedia message storing module 13. Each storage area corresponds to a user, and the sectioned different storage areas may be identified according to storage identifiers. Because different PoC terminals 14 are provided with different MMS user agent identifiers which may be used as the above-mentioned storage identifiers, different multimedia messages may be stored into the storage areas corresponding to the users, according to the storage identifiers.

The gateway transfer module 12 receives media streams transmitted by the PoC server and converts the media streams into multimedia messages and store the multimedia messages into the multimedia message storing module 13, retrieves messages from the multimedia message storing module 13, and converts the messages into media streams and send the media streams to the PoC server 11. In other words, the gateway transfer module 12 functions as a connection between the PoC server 11 and multimedia message storing module 13, and performs message conversion in the communication between the PoC server 11 and multimedia message storing module 13. The provided service based on the PoC service is a detailed illustration for the function of the gateway transfer module 12 as follows.

The gateway transfer module 12 may accept, in place of a PoC terminal 14, a session invitation from other terminals and participate in the session; perform the same operations as the PoC terminal 14 in a PoC session, for example, receiving media streams from the PoC server 11 and applying for speaking rights in a session; broadcast messages pre-stored (in the format of multimedia message) by the PoC terminal 14 corresponding to the multimedia message storing module 13; and make a record in the PoC session for the corresponding PoC terminal to review. The gateway transfer module 12 may perform the above operations for multiple PoC terminals 14, simultaneously.

Figure 3:
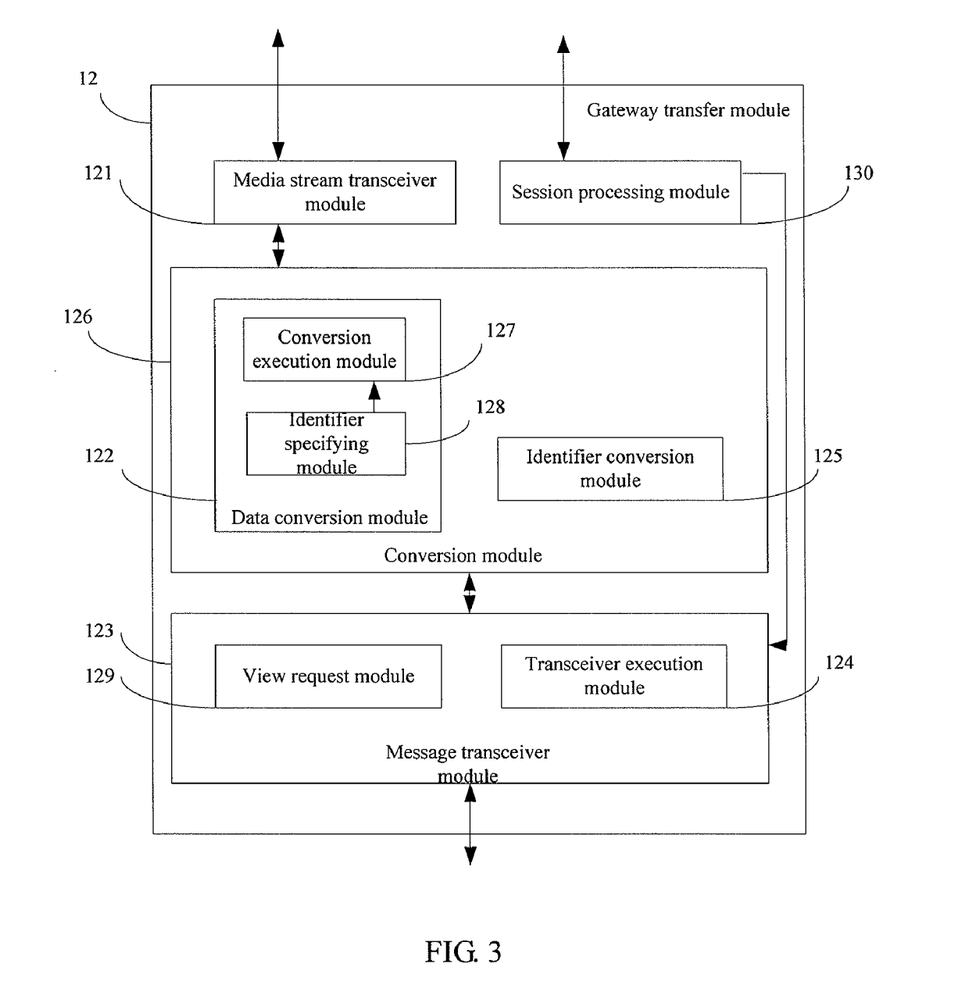
FIG. 3 shows a structure diagram of a gateway transfer module in FIG. 1 or 2.

Referring to FIGS. 1 and 3, in the system for implementing PoC session storing and broadcasting in accordance with an embodiment of the present invention, the gateway transfer module 12 may further include: a media stream transceiver module 121, a conversion module 126, and a message transceiver module 123.

The media stream transceiver module 121 receives media streams transmitted by the PoC server 11 from the PoC session and transmits them to the conversion module 126; receives media streams provided by the conversion module 126 and transmitted them to the PoC server 11.

The message transceiver module 123 retrieves the stored messages from the multimedia message storing module 13 and provides them to the conversion module 126, receives the messages provided by the conversion module 126, and stores them into the multimedia message storing module 13.

The conversion module 126 receives media streams transmitted by the media stream transceiver 121, converts them into multimedia messages complying with the message storing type for the multimedia message storing module 13, and transmits the converted messages to the message transceiver module 123; and receives multimedia messages transmitted by the message transceiver module 123, converts them into media streams, and transmits the media streams to the media stream transceiver module 121.

The conversion module may further include: a data conversion module 122 and an identifier conversion module 125.

The data conversion module 122 is adapted to receive media streams transmitted by the media stream transceiver module 121, convert the media streams into multimedia messages, and transmit the multimedia messages to the message transceiver module 123; and receive messages transmitted by the message transceiver module 123, convert the messages into media streams, and transmit the media streams to the media streams transceiver module 121.

The identifier conversion module 125 in which a corresponding relationship between the PoC identifier and the storage identifier, is adapted to convert the PoC identifier corresponding to the media stream transmitted by the media stream transceiver module 121 into a multimedia message and transmit the multimedia message to the message transceiver module 123; and convert the storage identifier corresponding to the message transmitted by the message transceiver module 123 into a PoC identifier and provide the PoC identifier to the media stream transceiver module 121.

In the storing of the multimedia messages, a designated identifier may be added for a multimedia message formed by conversion of the media stream in order to distinguish to which session the stored message belongs. Different designated identifiers represent messages of different sessions for the convenience of querying by the users. Therefore, the data conversion module 122 may further include a conversion execution module 127 and an identifier designation module 128.

The conversion execution module 127 is adapted to convert the media stream transmitted by the media stream transceiver module 121, add the designated identifier provided by the identifier designation module for the multimedia message after conversion, and then transmit the multimedia message to the message transceiver module 123.

The identifier designation module 128 is adapted to provide a designated identifier for the conversion execution module each time a media stream is converted into a multimedia message by the conversion execution module 127.

The designated identifier may be set as necessary, for example, the identifier corresponding to the message stored in a first session may be set to PoC-session-message-1. The data conversion module 122 needs to convert media stream control data into one or multiple multimedia messages and store them into the multimedia message storing module 13, in addition to converting the media stream into the multimedia message.

When speaking on behalf of the users, the gateway transfer module 12 needs to broadcast the messages pre-stored by the users. The message transceiver module 123 in the gateway transfer module 12 may further include query request unit 129 and a transceiver execution module 124.

The query request module 129 is adapted to initiate a message query request to the multimedia message storing module 13.

The transceiver execution module 124 is adapted to receive a query confirmation message returned by the multimedia message storing module 13, obtain the storage message carried in the query confirmation message, and transmit it to the data conversion module 122 and an identifier conversion module 125; and to receive the message provided by the data conversion module 122, and store the message into the storage area corresponding to a storage identifier in the multimedia message storing module 13, according to the storage identifier, which corresponds to the message and is provided by the identifier conversion module 125.

The gateway transfer module 12 may further include a session processing module 130 adapted to receive a session invitation sent by the PoC terminal 14 via the PoC server 11, process the session invitation to obtain a processing result, such as accept the session invitation or reject the session invitation, and return a response to the PoC terminal 14 via the PoC server 11; and to request a speaking right in the session, and transmit the request result received to the message transceiver module 123. Based on the division of the message transceiver module 123 in the embodiments of the invention, when the gateway transfer module 12 obtains the speaking right in the session, the session processing module 130 may transmit the speaking request result obtained to the query request module 129 in the message transceiver module 123.

In OMA PoC version 1.0, a maximum speaking duration is specified as 30 seconds, and the voice capacity is specified as 3.6KB. In OMA MMS version 1.3, a maximum capacity of the multimedia message with Rich content is specified as 600KB and a maximum capacity of the multimedia message with voice content as 13KB. Therefore, according to the current specification, a multimedia message converted from a media stream may not exceed the maximum capacity of the multimedia message. If the capacity of the media stream increases and exceeds the maximum capacity of the multimedia message, the media stream may be divided into parts by the data conversion module 122, each part being converted into a multimedia message. The division strategy may be determined by reference to rating strategies, such as a capacity most close to the maximum capacity of the multimedia message and an interval between two media streams.

Figure 2:
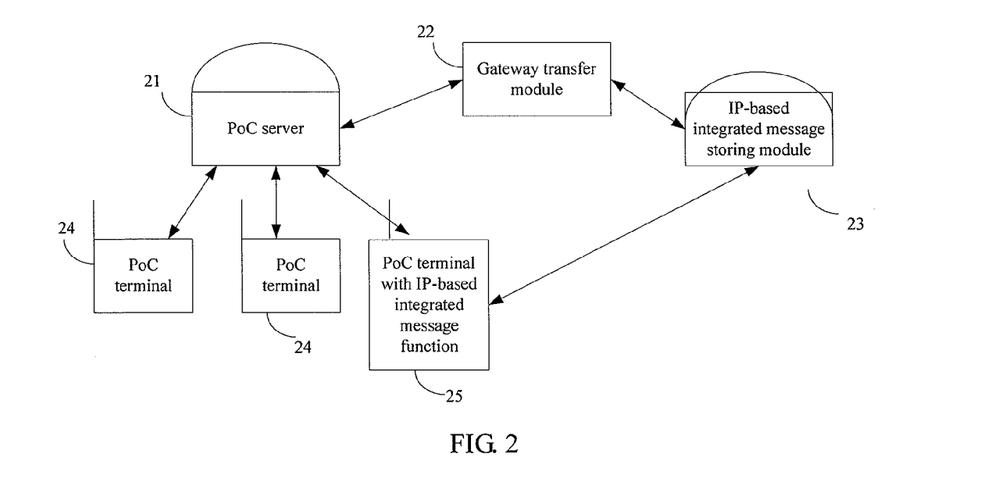
FIG. 2 shows a structure diagram of a system for implementing PoC session storing and broadcasting in accordance with another embodiment of the present invention.

FIG. 2 shows the structure of a system for implementing PoC session storing and broadcasting in accordance with a second exemplary embodiment of the present invention. The system includes a PoC server 21, a gateway transfer module 22, a CPM message storing module 23, and a plurality of PoC terminals 24 (the PoC terminal having CPM function is identified as 25).

Different from the first exemplary embodiment, in this embodiment the CPM message storing module supports the storage of a CPM message; the PoC terminal 25 having CPM function is used to conduct services directly with the CPM message storing module 23; the gateway transfer module converts the media streams transmitted by the PoC server 21 into CPM messages, converts the messages stored in the COM message storing module 23 into media streams, and transmits the media streams to the PoC server 21.

In this embodiment, apart from the above-mentioned differences with the first exemplary embodiment, functions, connections, and internal structure of the modules may be the same as those in the first exemplary embodiment and are not repeated here.

In this embodiment, the PoC terminal 25 having CPM function may include a mobile terminal, a computer terminal, etc. The PoC terminal 25 may access the CPM message storing module 23 via emails.

In this embodiment, if the capacity of the media streams exceeds the maximum capacity of the CPM messages, the data conversion module in the gateway transfer module 22 may also divide the media stream multiple parts, each part being converted into a CPM message. The division strategy may be determined by reference to rating strategies, such as a capacity most close to the maximum capacity of the CPM message and an interval between two media streams.

The multimedia message storing module and the CPM message storing module are two implementations of the message storing module in the PoC session storing and broadcasting system, in accordance with the embodiments of the invention. Other apparatus having the similar function may also be implementation of the message storing module.

Further, an apparatus provided in the embodiments of the invention for implementing PoC session storing and broadcasting is described as follows. The apparatus includes a media stream transceiver module, a message transceiver module, and a message conversion module.

The media stream transceiver module is adapted to receive the media stream of the session, transmit the media stream to the conversion module, and send the media stream provided by the conversion module to the session.

The message transfer module is adapted to acquire the stored message from the message storing module outside the apparatus and provide the conversion module with the message, receive the message provided by the conversion module, and store the message into the message storing module.

The conversion module is adapted to receive the media stream transmitted by the media stream transceiver module and convert the message into the storing pattern complying with the message storing module outside the apparatus, receive the message transmitted by the message transceiver module, convert the message into media stream, and transmit the media stream to the media stream transceiver module.

A method provided in the embodiments of the invention for implementing PoC session storing and broadcasting. The procedure of the method includes:

receiving the media stream, converting the media stream into the message complying with the storing pattern of the message storing module, and storing the message into the message storing module by a gateway transfer module; and reading the message pre-stored in the message storing module, converting the message into the media stream, and sending the media stream to the session by the gateway transfer module.

In the procedure mentioned above, the gateway transfer module converts the media streams and stores the converted media streams into the message storing module corresponding to the case of storing the speaking of the users in a session, and converts the stored message and participates in the session corresponding to the case of broadcasting the stored message of the users for participating in the session.

The present invention enables storing and broadcasting of PoC sessions, converts a media stream into a pattern storable by the message conversion module, and converts a message stored in the message storing module to a media stream for participating in the session. Therefore, the message storing module can use the resources capable of storing PoC message or similar functions in the existing network, thus reusing the resources in the existing network. Through conversion between a media stream and a message, the present invention avoids the trouble of using the PoC storing apparatus capable of storing PoC messages specified in the specifications, and the trouble of building a complete new infrastructure for interoperating with the PoC storing apparatus. Therefore, the present invention implements PoC session storing and broadcasting at lower costs.

In the process of implementing the method of storing and broadcasting PoC sessions in an embodiment of present invention, when the media stream received in the session is converted to a pattern storable by the message storing module, if the capacity of the media stream exceeds the maximum capacity of message conversion, the media stream can be divided into multiple segments, and each segment can be converted into a message.

In order to differentiate speech content between PoC sessions, an identifier may be specified for a converted message, and each specified identifier represents a different PoC session.

The message storing module may be a message storing module that supports the MMS or CPM service, or other storing module having a function similar to PoC message storing.

Figure 4:
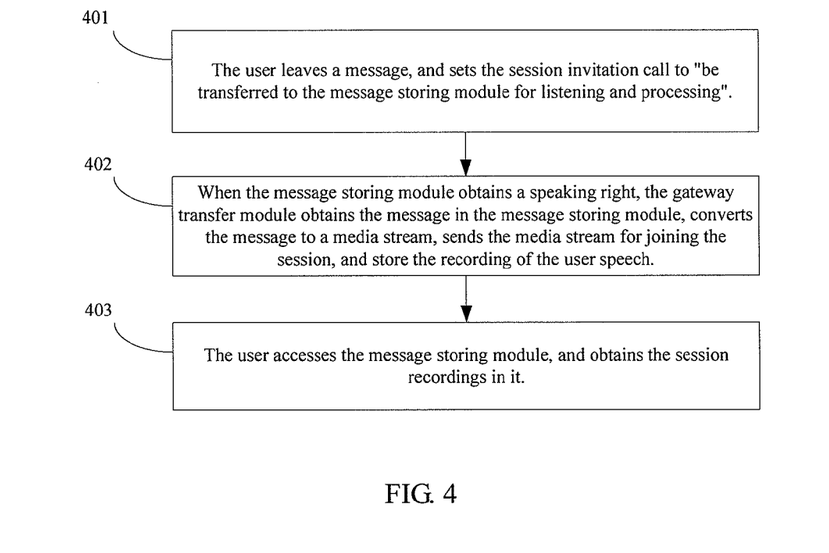
FIG. 4 shows a flow chart diagram of a method for implementing PoC session storing and broadcasting in accordance with an embodiment of the present invention.

The method for storing and broadcasting PoC sessions in an exemplary embodiment of the present invention is described below. FIG. 4 is a flowchart of the method for storing and broadcasting PoC sessions in an embodiment of the present invention. In the flowchart, the message storing module is a CPM message storing module. Suppose that a user scheduled to participate in the PoC session is unable to participate in the session, and a CPM message storing module participates in the session and speaks in place of the user. At any time after completion of the session, the user can listen to the speech content of the session. The terminal applied by the user is a PoC terminal with a CPM function. The user can listen to the stored speech content of other users after completion of the session. The process of this preferred embodiment includes the following steps:

Step 401: A user leaves a message on a CPM message storing module through a CPM-enabled PoC terminal, and sets the session invitation call to "be transferred to the CPM message storing module for listening and handling." Message leaving may be done through a computer or through a microphone. The terminal sends the voice files to the CPM message module by email for broadcasting in the session.

Step 402: After the PoC session begins, the gateway transfer module participates in the PoC session on behalf of the CPM message storing module. After getting a speaking right, the gateway transfer module obtains and sends the message in the CPM message storing module to speak, and stores the record of the speech of other users on the site.

Step 403: After completion of the PoC session, the user accesses the CPM message storing module through a CPM-enabled PoC terminal to obtain the record of the PoC session in the module.

The method for storing and broadcasting PoC sessions under the present invention may be applied to the system for storing and broadcasting PoC sessions under the present invention. The following is a method for storing and broadcasting PoC sessions based on the architecture of the system, according to the first exemplary embodiment described above.

First, several business processes of storing and broadcasting PoC sessions are described below based on the architecture of the system in the first embodiment of the present invention, where the message storing module is a MMS storing module.

Figure 5:
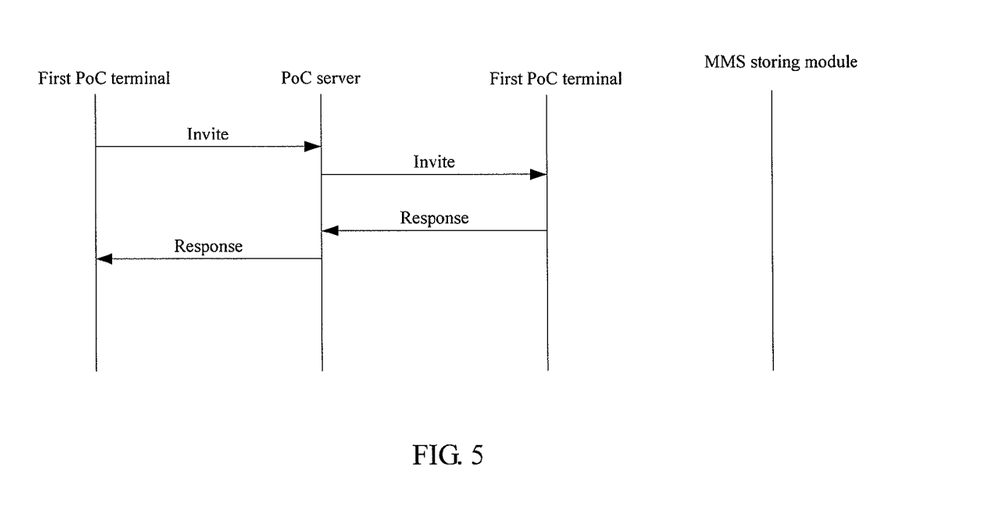
FIG. 5 shows a process of participating in a PoC session of a method for storing and broadcasting a PoC session in accordance with an embodiment of the present invention.

FIG. 5 shows a process of participating in a PoC session of a method for storing and broadcasting a PoC session corresponding to an embodiment of the present invention. As shown in FIG. 1 and FIG. 5, in a PoC session, the first PoC terminal is the session organizer, and uses a SIP Invite message to invite the MMS storing module of the second PoC terminal to participate in the session. The SIP Invite message carries the address of the PoC user, media parameters of the session, and indication of requesting the MMS storing module. The second PoC terminal is unable to participate in the session. The PoC server forwards the Invite message to the gateway transfer module. The gateway transfer module accepts the invitation on behalf of the called terminal, namely, the MMS storing module of the second PoC terminal. The response message carries the media parameters, the type and the indication of the MMS storing module. The PoC server forwards the response message to the first PoC terminal. Alternatively, the gateway transfer module can also reject the invitation and return a response about rejection of the invitation to finish the process.

Figure 6:
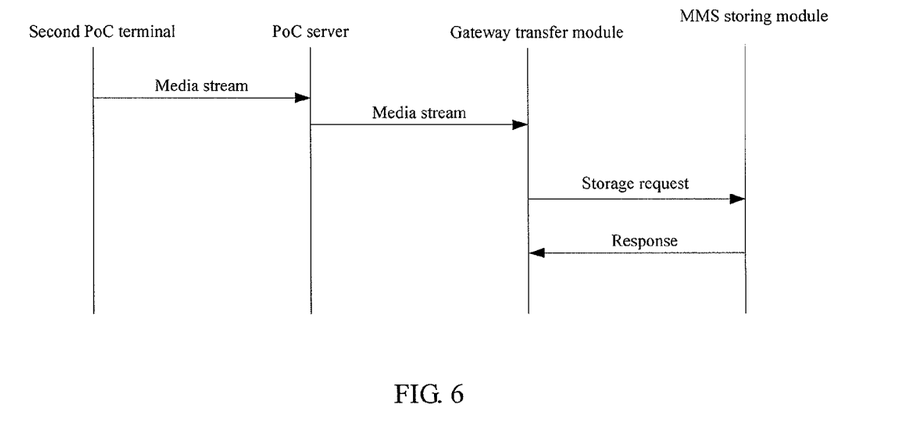
FIG. 6 shows a process of recording a PoC session of a method for storing and broadcasting a PoC session in accordance with an embodiment of the present invention.

FIG. 6 shows a process of recording a PoC session of a method for storing and broadcasting a PoC session according to an embodiment of the present invention, namely, a session storing process, in which the speech of the second PoC terminal is recorded. As shown in FIG. 1 and FIG. 6, when recording a PoC session, the second PoC terminal obtains the speaking right, and sends a media stream to the PoC server. After receiving the media stream, the PoC server copies the media stream to all participating PoC terminals, including the MMS storing module of the second PoC terminal. The PoC server sends one copy of the media stream to the gateway transfer module. After receiving the media stream, the gateway transfer module extracts the SIP URL address from the received media stream in order to store the media stream into the corresponding user storage area in the MMS storing module, and converts the address into a MMS user address such as a MSISDN (namely, converts the address into a storage identifier of the corresponding user storage area), generates a storage request, and submits the request to the MMS storing module. The MMS storing module stores multimedia messages for the MMS user and returns a response message.

Figure 7:
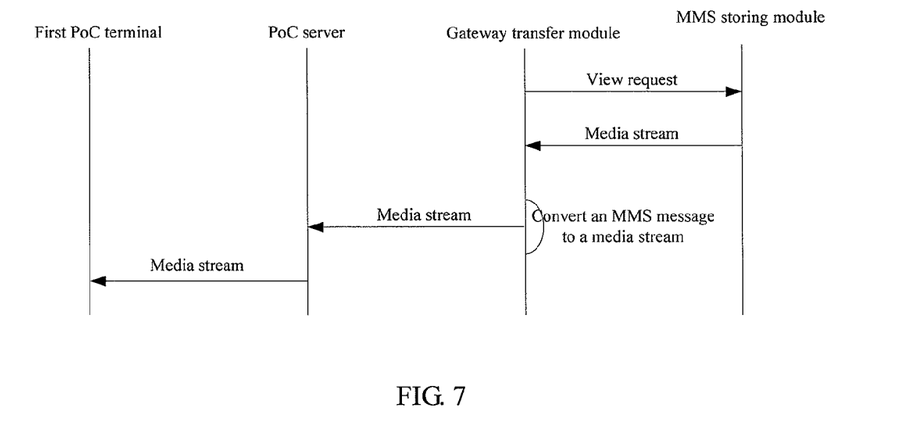
FIG. 7 shows a process of speaking in a PoC session of a method for storing and broadcasting PoC sessions in accordance with an embodiment of the present invention.

FIG. 7 shows a process of speaking in a PoC session of a method for storing and broadcasting PoC sessions according to an embodiment of the present invention, wherein the gateway transfer module speaks in place of the second PoC terminal. As shown in FIG. 1 and FIG. 7, after applying for the speaking right successfully, the gateway transfer module sends a view request, i.e. MMBox-View.REQ, to the MMS storing module to obtain the recorded messages of the MMS storing module (the recorded messages may be MMS messages with a specified identifier). The MMS storing module returns a view confirmation i.e. MMBox-View.CONF, which carries multiple MMS messages as recorded messages of the second PoC terminal. The gateway transfer module extracts media contents from the obtained MMS messages, converts the contents into media streams in the RTP format, and sends the media streams to the PoC server. The PoC server distributes the media streams to all participants of the session.

Described above is the process of storing and broadcasting a PoC session; and, introduced below are several circumstances in which a MMS-enabled PoC terminal communicates with a MMS storing module directly.

Figure 8:
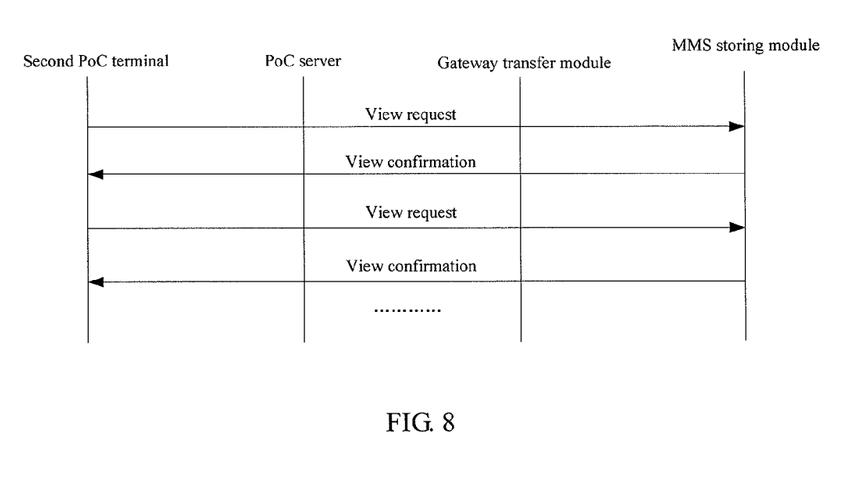
FIG. 8 shows a process of retrieving the recordings of a method for storing and broadcasting a PoC session in accordance with an embodiment of the present invention.

FIG. 8 shows a process of retrieving the recordings of a method for storing and broadcasting a PoC session in an embodiment of the present invention. As shown in FIG. 1 and FIG. 8, in order to retrieve the recordings of a session in the PoC storing module, the second PoC terminal having MMS function sends a view request, i.e. MMBox-View.REQ, to the MMS storing module. The MMS storing module returns a view confirmation, i.e. MMbox-View.conf, which carries part of the recordings. The second PoC terminal repeats the step until all recordings are viewed.

Figure 9:
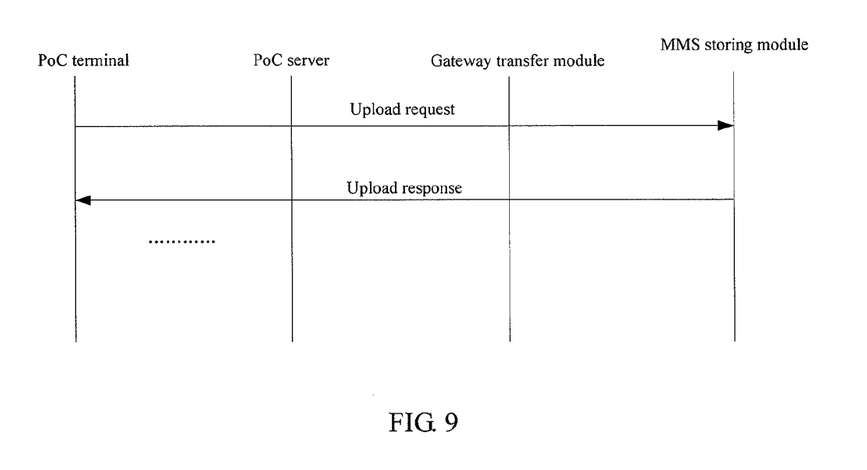
FIG. 9 shows a process of recording a PoC session message of a method for storing and broadcasting a PoC session in accordance with an embodiment of the present invention.

FIG. 9 shows a process of recording a PoC session message of a method for storing and broadcasting a PoC session. As shown in FIG. 9, in order to record a message in a PoC session, a MMS-enabled PoC terminal may generate multiple MMS messages with specified identifiers based on the message generation function provided by MMS and uploads the messages to the MMS storing module. Such messages serve as the user messages to be played in the PoC session.

Described above are several processes of storing and broadcasting a PoC session based on the first preferred embodiment of the present invention and several circumstances in which a MMS-enabled PoC terminal communicates with a MMS storing module directly. Such processes can also be based on the second preferred embodiment of the present invention.

The method, system, and apparatus for storing and broadcasting PoC sessions under the present invention converts a media stream into a pattern storable by the message conversion module, and converts a message stored in the message storing module to a media stream for participating in the session. Therefore, the message storing module can use resources capable of storing PoC messages or similar functions in the existing network, for example, the function of storing MMS messages through a voice mailbox in the existing network and voice mailbox function, thus reusing the resources in the existing network. Through message conversion between a message storing module and a PoC server, the present invention avoids the trouble of using the PoC message storing function specified in the specifications, and avoids the trouble of building a complete new infrastructure for interoperating with the PoC storing apparatus. Therefore, the present invention implements PoC session storing and broadcasting at lower costs.

Although the invention has been described through some exemplary embodiments, the invention is not limited to such embodiments. It is apparent that those skilled in the art can make various modifications and substitutions to the invention without departing from the scope of the invention. The invention is intended to cover the modifications and substitutions provided that they fall in the protection scope defined by the following claims or their equivalents.

What is claimed is:

1. A method for storing and broadcasting a push to talk over cellular (PoC) session, comprising:
    receiving, by a gateway transfer module, a first media stream in a session, converting the first media stream to a first message complying with a storing pattern of a message storing module, and storing the first message to the message storing module; and
    reading a second message pre-stored in the message storing module, converting the second message into a second media stream, and sending the second media stream for participating in the session;
    wherein the message storing module comprises different storage areas of different users, each storage area corresponds to a storage identifier, and the media stream comprises different PoC identifiers corresponding to the different users; and
    wherein the converting of the first media stream into the first message complying with the storing pattern of the message storing module further comprises:
    converting, by the gateway transfer module, the first media stream into the first message complying with the storing pattern of the message storing module, converting a first PoC identifier in the first media stream into a first storage identifier corresponding to a user who sends the first media stream, and storing the first message into the storage area corresponding to the first storage identifier in the message storing module; and
    wherein the reading of the second message pre-stored in the message storing module and converting the second message into a second media stream further comprises:
    reading the second message pre-stored in the message storing module, converting the second message into the second media stream, and converting a second storage identifier in the second message into a second PoC identifier of the corresponding user.

2. The method of claim 1, characterized in that the receiving of the first media stream in the session further comprises:
    receiving, by the gateway transfer module, a session invitation; and
    sending a rejection response and terminating the process if the session invitation is rejected or sending an acceptance response and continuing with the subsequent processes of receiving the first media stream if the session invitation is accepted.

3. The method of claim 1, wherein:
    after the first PoC identifier in the first media stream is converted into the first storage identifier corresponding to the user who sends the first media stream, the first message is stored to the storing module after a specified identifier is affixed to the first message for the purpose of identifying the PoC session that covers the message.

4. The method of claim 1, wherein: if the capacity of the first media stream received by the gateway transfer module exceeds the capacity of messages complying with the storing pattern of the message storing module at a time, the converting of the first media stream into the first message complying with the storing pattern of the message storing module comprises:
    dividing the first media stream into more than one segment, and converting each segment into a message complying with the storing pattern of the message storing module.

5. The method of claim 1, wherein the gateway transfer module reads the second message pre-stored in the message storing module after the gateway transfer module applies for a speaking right, and performs no further operation if the speaking right is not approved or continues with the subsequent process of reading the second message pre-stored in the message storing module if the speaking right is approved.

6. The method of claim 1, wherein the reading of the second message pre-stored in the message storing module comprises:
    by the gateway transfer module, sending a view request to the message storing module, receiving the view confirmation message returned by the message storing module, and reading the second message carried in the view confirmation message.

7. The method according to claim 1, wherein the sending the second media stream for participating in the session comprises: viewing or deleting the message stored in the message storing module through a PoC terminal.

8. The method according to claim 1, wherein the message complying with the storing pattern of the message storing module is a Multimedia Messaging Service (MMS) message or a Converged IP messaging (CPM) message.

9. A system for storing and broadcasting a push to talk over cellular (PoC) session, comprising a message storing module and a gateway transfer module, wherein:
the message storing module is adapted to receive and store a first message transferred by the gateway transfer module and to pre-store a message for the gateway transfer module to read; and
the gateway transfer module is adapted to convert a first media stream received in a session into the first message complying with the storing pattern of the message storing module, and store the first message to the message storing module; and read a second message from the message storing module, convert the second message into a second media stream, and send the second media stream for participating in the session;
wherein the gateway transfer module further comprises:
a media stream transceiver module, adapted to receive the first media stream transferred by a PoC server, transmit the first media stream to a conversion module, receive the second media stream sent by the conversion module, and transmit the second media stream to the PoC server;
a message transceiver module, adapted to obtain a second message from the message storing module and send the second message to the conversion module, and receive the first message sent by the conversion module and store the first message into the message storing module; and
a conversion module, adapted to receive the first media stream transferred by the media stream transfer module, convert the first media stream into the first message complying with a storing pattern of the message storing module, and transmit the first message to the message transceiver module; and receive the second message transferred by the message transceiver module, convert the second message into a second media stream, and transmit the media stream to the media stream transceiver module;
wherein the conversion module further comprises:
a data conversion module, adapted to receive the first media stream transferred by the media stream transfer module, convert the first media stream into the first message complying with a storing pattern of the message storing module, and transmit the first message to the message transceiver module; and receive the second message transferred by the message transceiver module, convert the second message into the second media stream, and transmit the second media stream to the media stream transceiver module; and
an identifier conversion module, adapted to store the corresponding relation between a PoC identifier and a storage identifier; convert the first PoC identifier corresponding to the first media stream transferred by the media stream transceiver module into a first storage identifier in the message storing module, and transmit the first storage identifier to the message transceiver module; and convert a second storage identifier corresponding to the second message transferred by the message transceiver module into a second PoC identifier, and send the second PoC identifier to the media stream transceiver module.

10. The system of claim 9, further comprising:
a PoC server, adapted to receive the first media stream sent by a PoC terminal involved in the session, transfer the first media stream to the gateway transfer module, receive the second media stream transferred by the gateway transfer module, and send the second media stream to the PoC terminal involved in the session.

11. The system of claim 9, wherein the data conversion module comprises:
a conversion execution module, adapted to convert the first media stream transferred by the media stream transceiver module into the first message complying with a storing pattern of the media storing module; affix an first identifier specified by the identifier specifying module to the first message, and transmit the first message to the message transceiver module; and receive the second message transferred by the message transceiver module, convert the second message into a second media stream, and transmit the second media stream to the media stream transceiver module; and
an identifier specifying module, adapted to send the first identifier to the conversion execution module once the conversion execution module converts the first media stream into the first message complying with a storing pattern of the message storing module.

12. The system of claim 9, wherein the message transceiver module comprises:
a view request module, adapted to send a message view request to the message storing module; and
a transceiver execution module, adapted to receive a view confirmation message returned by the message storing module, obtain the second message carried in the view confirmation message, transmit the second message to the data conversion module and the identifier conversion module, receive the first message sent by the data conversion module, and store the first message to the storage area corresponding to the storage identifier in the message storing module according to the first storage identifier sent by the identifier conversion module.

13. The system of claim 9, wherein the gateway transfer module further comprises:
a session processing module, adapted to receive the session invitation sent by the PoC terminal through a PoC server, handle the session invitation and obtain the result of accept or reject the invitation, return a response to the PoC terminal of the user through the PoC server, apply for a speaking right in the session, and transfer the received result of application to the message transceiver module.

14. An apparatus for storing and broadcasting PoC sessions, comprising:
a media stream transceiver module, adapted to receive a first media stream in the session, transmit the first media stream to a conversion module, and transmit a second media stream sent by the conversion module for participating in the session;
a message transceiver module, adapted to obtain a second message from the message storing module outside the apparatus, and send the second message to the conversion module; and receive a first message sent by the conversion module, and store the first message into the message storing module; and
the conversion module, adapted to receive the first media stream transferred by the media stream transfer module, convert the first media stream into the first message complying with the storing pattern of the message storing module outside the apparatus, and transmit the first message to the message transceiver module; and receive the second message transferred by the message transceiver module, convert the second message into the second media stream, and transmit the second media stream to the media stream transceiver module;

wherein the message storing module outside the apparatus comprises different storage areas of different users, each storage area corresponding to a storage identifier, and the media stream comprising different PoC identifiers;

the conversion module further comprises:

a data conversion module, adapted to receive the first media stream transferred by the media stream transfer module, convert the first media stream into the first message complying with the storing pattern of the message storing module, and transmit the first message to the message transceiver module; and receive the second message transferred by the message transceiver module, convert the second message into the second media stream, and transmit the second media stream to the media stream transceiver module; and an identifier conversion module, adapted to store the corresponding relationship between a PoC identifier and a storage identifier; convert a first PoC identifier corresponding to the first media stream transferred by the media stream transceiver module into a first storage identifier in the message storing module, and transmit the first storage identifier to the message transceiver module; and convert a second storage identifier corresponding to the message transferred by the message transceiver module into a second PoC identifier, and send the second PoC identifier to the media stream transceiver module.

* * * * *